Oct. 28, 1924.

P. UTNE

Re. 15,938

BUMPER FOR MOTOR VEHICLES

Original Filed Feb. 28, 1922

INVENTOR

Per Utne

By Kay, Totten & Martin,

Attorneys

Reissued Oct. 28, 1924. Re. 15,998

UNITED STATES PATENT OFFICE.

PER UTNE, OF EDGEWOOD, PITTSBURGH, PENNSYLVANIA, ASSIGNOR TO UNITED STATES CHAIN & FORGING COMPANY, OF PITTSBURGH, PENNSYLVANIA, A CORPORATION OF DELAWARE.

BUMPER FOR MOTOR VEHICLES.

Original No. 1,417,118, dated May 23, 1922, Serial No. 540,027, filed February 28, 1922. Application for reissue filed May 6, 1924. Serial No. 711,517.

*To all whom it may concern:*

Be it known that I, PER UTNE, a citizen of the United States, residing in Edgewood, Pittsburgh, county of Allegheny, and State of Pennsylvania, have invented certain new and useful Improvements in Bumpers for Motor Vehicles, of which the following is a specification.

My invention relates to bumpers or buffers for motor vehicles, and it has for its object to provide a bumper which is durable, simple and economically manufactured and can be easily repaired in case of distortion or breakage. I will describe a bumper embodying my invention and then point out the novel features thereof in claims.

Figure 1:
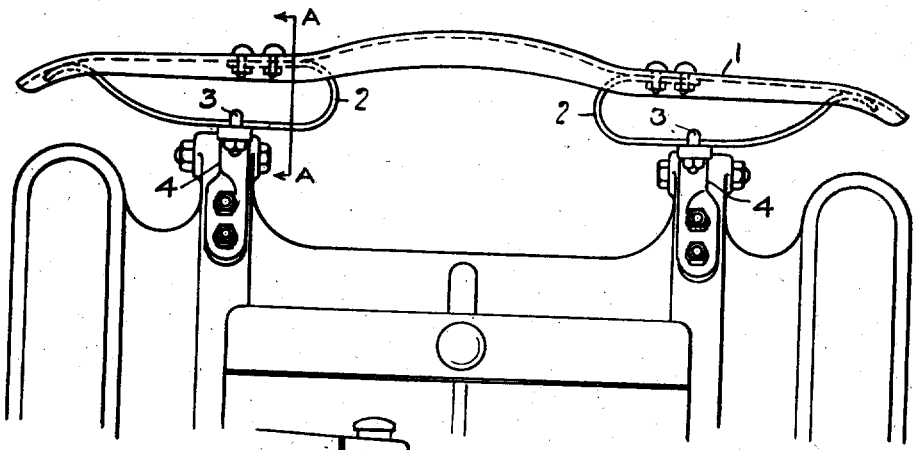
Figure 2:
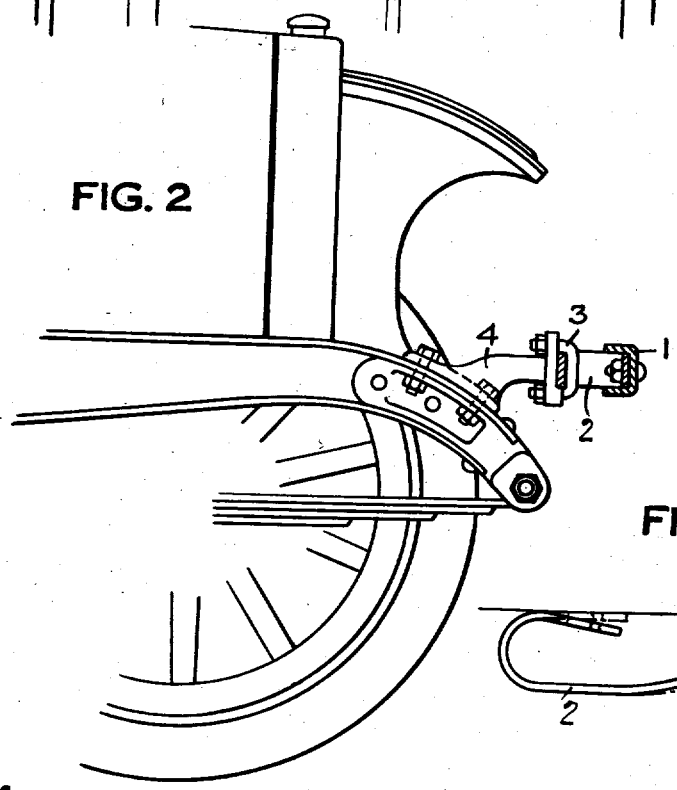
Figure 3:
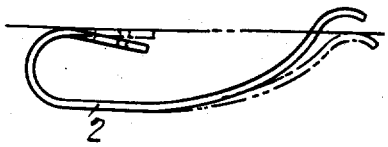
Figure 4:
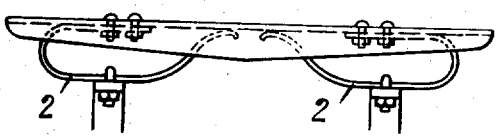

In the accompanying drawings, Fig. 1 is a top plan view of a bumper embodying my invention and suitably attached to a motor vehicle, only a portion of which is shown. Fig. 2 is a vertical sectional view taken on the line A—A, Fig. 1. Fig. 3 is a detail view of a spring forming part of a bumper embodying my invention. Fig. 4 is a top view of a modification embodying my invention.

Similar reference characters designate corresponding parts in the several figures.

In the drawings, 1 designates a bar, preferably of a U-formed cross-section, formed from suitable material, preferably steel. The center portion is shown curved outward and the ends curved backward. While the channel may be formed in a straight line for its entire length, it will be seen that the outwardly curved central portion will assist in centralizing shocks and thus distribute the pressure due to shocks more evenly to the frame of the vehicle. The object of curving the ends is to reduce the space covered by the bumper and also add to the appearance.

It will be noticed that the flanges of the channel 1 are highest at the center and gradually taper down towards the ends. This taper not only adds to the appearance, but it provides a stronger section in the center portion where the maximum strength is needed and consequently the material is used to its best advantage, giving a maximum strength and keeping the weight down to a minimum and without establishing any weak sections in the channel.

Fastened securely to the channel 1 are the springs 2. It will be noted that only one end of each spring, which is bent in approximately a half circle is secured to the channel. The other end, which is formed to give additional support to the channel engages with it and is free to slide in the channel when deflected. The form of each spring is preferably such that tension is set up in it when secured to the channel in order to prevent rattling.

Fig. 1 shows the springs attached to the channel 1, with the free ends turned out, while same could be turned in towards the center as well without departing from the scope of this invention as shown in Fig. 4.

The springs as shown in Fig. 3 are secured to brackets 3, which in turn are fastened to the frame of vehicle as indicated at 4.

While the outer ends of the springs 2 are shown as free to slide in the channel bar, it will be understood that they may be secured against movement relatively to the bar. It will also be understood that the outer ends may be given a semi-circular or semi-elliptical form similar to the inner ends thereof. In either case, an important advantage is secured, namely, the provision of a supporting structure for the bumper bar at a plurality of points adjacent to each end of the bar and the structure permits the employment of a flat spring of relatively great length and hence increased yielding capacity, without the necessity of locating the bumper bar at a point too far in front of the vehicle body. Further, those ends of the spring 2 which lie in front of the mud guards of the vehicle are depressed, thus providing ample space for movement of the bar 1, and for wheel clearance.

The ends of each spring engage with the bumper bar at points adjacent to those portions of the bar most often subjected to impacts as when colliding with another vehicle. The bar is thus more firmly supported against distortion than if each spring engaged it only at one point.

While I have shown the bumper as applied to one end of a vehicle, it will be apparent that it may be disposed along the side thereof to protect that portion of the vehicle.

What I claim as my invention is:

1. A bumper comprising a bar; and a pair of springs, one end portion of each spring being bent in a half circle and secured at that end to the bar, and the other end pressing against the bar and having a sliding engagement therewith.

2. In combination a bumper comprising a channel bar and a pair of springs, one end portion of each spring being bent in a half circle and secured at that end to the bar between the flanges, and the other end pressing against the bar and having a sliding engagement therewith.

3. A bumper comprising a bar and a pair of flat springs one end portion of each spring being bent in a half-circle and secured to said bar, and the other end of each spring engaging the bar at a point removed from the said point of attachment.

4. A bumper comprising a bar and a pair of flat springs, one end portion of each spring being bent in a half circle and secured to said bar, and the other end thereof being also curved at its point of engagement with the bar and extending in the same general direction as said first-named end.

5. A bumper comprising a bar adapted to be mounted across one end of a vehicle, a spring for supporting each end of said bar, each of said springs having one end thereof bent in a half circle and the other end relatively depressed, and means for attaching said springs to the vehicle, the said depressed end of each spring being disposed in front of a wheel of the vehicle.

6. A bumper for vehicles comprising a bar, a spring for supporting each end of said bar, each of said springs having one of its ends in the form of a wide curve and its other end relatively depressed, and means for securing said springs at their intermediate point to a vehicle, the depressed end of said springs being so disposed as to lie opposite an adjacent wheel of the vehicle.

7. A bumper comprising a bar and a pair of flat springs, one end of each spring being bent in a half circle and secured to said bar, and the other end thereof being also curved and disposed in position to engage the bar.

PER UTNE.